Nov. 22, 1932.  J. R. SINCLAIR  1,888,892

DANDY ROLL

Filed Sept. 29, 1931

INVENTOR,
John R. Sinclair,

BY

Harry W. Bowen.
ATTORNEY.

Patented Nov. 22, 1932

1,888,892

UNITED STATES PATENT OFFICE

JOHN R. SINCLAIR, OF HOLYOKE, MASSACHUSETTS

DANDY ROLL

Application filed September 29, 1931. Serial No. 565,817.

This invention relates to improvements in dandy rolls which are used in paper making machines for imparting a water, or trademark to the sheet of paper, as it passes through the machine and usually when the web of paper is in a moist or wet condition and has not been dried.

An object of my invention is to provide a dandy roll construction which will automatically clean itself as it is rotated, and one that can be operated at a higher speed to effect its clearance of foam and waste material. I employ a spiral channel located on the interior thereof for automatically conveying the foam and other waste matter detrimental to the clearance of the dandy roll, so that it runs easily in the machine and at higher speed for this purpose.

This spiral channel comprises a strip of thin material, as sheet brass or copper having its opposite edges turned upward and with the channel facing radially outward, whereby the foam and the other waste products do not gain access to the interior of the dandy roll and impede its operation. It is an improvement on the dandy roll shown in my prior patent #1,140,856 dated May 25, 1915.

Referring to the drawing.

Figure 1:
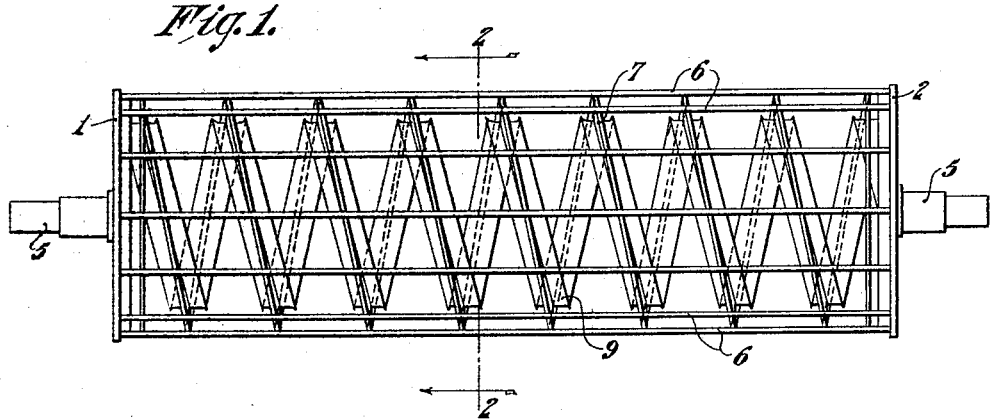
Fig. 1 is a skeleton view of the frame work of the roll showing the end or head members; the journal bearings, the parallel rods to which the spiral support is secured and the spiral shaped channel member secured to the spiral support.
Figure 2:
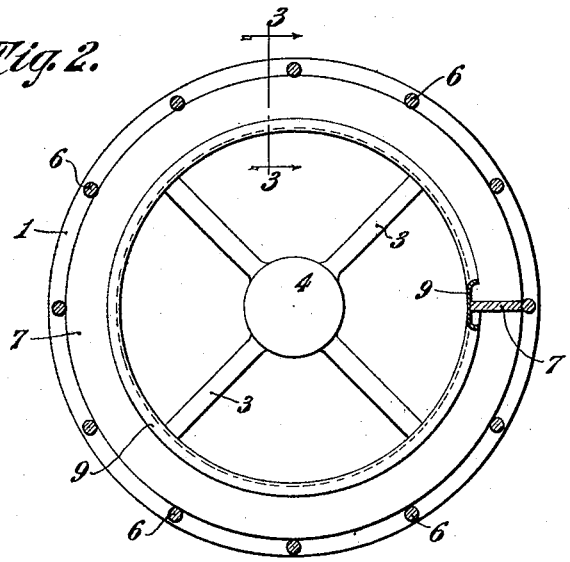
Fig. 2 is a cross sectional view on the line 2—2 of Fig. 1 showing a portion of the spiral support of the spiral channel section.
Figure 3:
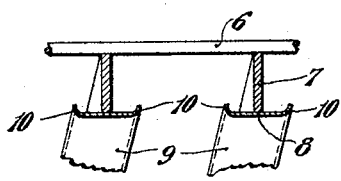
Fig. 3 is a detail fragmentary view illustrating two portions of the spiral support and two portions of the spiral channel.

Referring to the drawing in detail: 1 and 2 indicate the usual heads of the dandy roll which are formed with open ends by means of the spokes 3. The center portion 4 of each head has the journal 5 suitably secured thereto. Extending between the heads 1 and 2 are the parallel rods 6. Secured to the inner edges of the rod 6 is the spiral support 7. The rods 6 and the support 7 are secured together in any suitable way, as by brazing or soldering.

Secured to the inner edge 8 of the spiral support 7 is a spiral or channel-shaped member 9 formed by the up-turned edges 10, which extend outwardly as shown. This channel shaped member is secured at the edge or point 8 by any suitable means, as brazing or soldering and consists of a thin strip of material, preferably of copper or brass in order to provide lightness of the dandy roll. In operation the foam or other waste matter which passes through the usual reticulated sleeve of the dandy roll, not shown, is caught by this channel shaped member and conveyed outwardly through the open ends of the heads. Such a construction materially lessens the power required to rotate the dandy roll as it is automatically freed of the accumulation of foam or waste on the interior thereof. It is, of course, obvious that the width of the spiral member 9 may be varied to suit the different sizes of dandy roll and the spaces between the edges of the spiral member may be varied as desired. The usual water marking gauze is not shown.

From this description, it will be evident that I have provided a dandy roll construction that it inexpensive to make, efficient in operation and one that will automatically clean itself, when rotated in either direction. It is not necessary to remove it from the machine for cleaning, it increases production, as it can be speeded up and a better formation of the mark in the sheet made.

Figure 4:
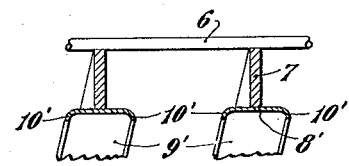
Fig. 4 is a modification.

In Fig. 4 is shown the channel member 9' with the edges 10' extending inward, if desired to carry off any waste material or foam that may pass through the sieve.

What I claim is:

1. A dandy roll construction comprising in combination, head members, journal members attached thereto, rods extending between the head members, a rigid spiral support secured to the rods, and a rigid spiral member formed with outwardly extending radial flanges secured to the said support for receiving and conveying away any material that may pass through from the outer to the inner portion of the roll.

2. In a dandy roll construction, head members, journal members secured thereto, rods extending between the head members, a spiral support secured to the rods and an interiorly located spiral member secured to the support for receiving and conveying away any material that may pass through from the outer to the inner portion of the roll, said spiral member comprising a strip having its opposite edges turned upward to form an outwardly facing rigid channel shape construction in cross section.

3. A dandy roll comprising in combination, head members, journals secured to the head members, rod members, a support attached to the rods, rigid U-shaped channel means secured to the support and facing outward for conveying away any material that passes from the outer to the inner portion of the roll for automatically cleaning the roll as it is rotated, as described.

4. A dandy roll comprising a spiral reinforcing bar member located inside of and secured to a plurality of longitudinal rods, a spiral channel-shaped gutter member secured to said spiral reinforcing bar with the flanges of said channel-shaped member extending outwardly.

JOHN R. SINCLAIR.